United States Patent [19]
Choo et al.

[11] Patent Number: 5,781,579
[45] Date of Patent: Jul. 14, 1998

[54] MICROWAVE EXCITED GAS LASER APPARATUS

[75] Inventors: Doukei Choo, Amagasaki; Shigeki Yamane, Kobe; Daiji Narita, Osaka, all of Japan

[73] Assignee: Matsushita Electric Industrial Co., Ltd., Osaka, Japan

[21] Appl. No.: 787,709

[22] Filed: Jan. 24, 1997

[30] Foreign Application Priority Data

Jan. 25, 1996 [JP] Japan ................................. 8-032953

[51] Int. Cl.$^6$ .............................................. H01S 3/03
[52] U.S. Cl. .................. 372/64; 372/55; 372/61; 372/81; 372/87
[58] Field of Search .................... 372/9, 55, 56, 372/57, 58, 61, 62, 64, 65, 69, 70, 92, 108, 81, 87

[56] References Cited

U.S. PATENT DOCUMENTS

| | | | |
|---|---|---|---|
| 4,751,715 | 6/1988 | Henderson | 372/64 |
| 5,050,181 | 9/1991 | Gekat | 372/69 |
| 5,224,117 | 6/1993 | Kruger et al. | 372/82 |
| 5,255,282 | 10/1993 | Remo | 372/82 |
| 5,379,317 | 1/1995 | Bridges et al. | 372/64 |
| 5,475,704 | 12/1995 | Lomashevich | 327/92 |
| 5,479,428 | 12/1995 | Kuzumoto et al. | 372/61 |
| 5,572,541 | 11/1996 | Suni | 372/70 |
| 5,606,571 | 2/1997 | Furuya et al. | 372/82 |

FOREIGN PATENT DOCUMENTS

| | | | |
|---|---|---|---|
| 61-220486 | 9/1986 | Japan | 372/64 X |
| 3125485 | 5/1991 | Japan | 372/64 X |

*Primary Examiner*—Brian Healy
*Attorney, Agent, or Firm*—Pollock, Vande Sande & Priddy

[57] ABSTRACT

A microwave excited gas laser apparatus includes a single unit having at least first, second, third, and fourth waveguides. The first and second waveguides meet at a first intersection. The third and fourth waveguides meet at a second intersection. A discharge tube contains a laser medium gas, and extends through the first and second intersections. Microwaves are radiated into the first, second, third, and fourth waveguides. The discharge tube in the first intersection is exposed to a microwave propagated along the first waveguide and a microwave propagated along the second waveguide. The discharge tube in the second intersection is exposed to a microwave propagated along the third waveguide and a microwave propagated along the fourth waveguide.

9 Claims, 14 Drawing Sheets

MICROWAVE EXCITED GAS LASER APPARATUS

BACKGROUND OF THE INVENTION

1. Field of the Invention

This invention relates to a microwave excited gas laser apparatus which can be used as, for example, an energy source in a laser material processing system.

2. Description of the Prior Art

In microwave excited gas laser apparatuses, molecules of laser medium gas such as $CO_2$ gas are excited to high energy states by microwave through a discharge process to implement laser oscillation. Generally, such microwave excited gas laser apparatuses are able to output high-power laser light beams. There are microwave excited gas laser apparatuses used as energy sources in laser material processing systems or laser machining systems.

Microwave excited gas laser apparatuses include a discharge tube through which laser medium gas flows. In some cases, portions of the discharge tube are disposed in waveguides for microwave. The laser medium gas in these portions of the discharge tube is exposed to the microwave propagated along the waveguides. The laser medium gas is excited by the microwave through a discharge process. Generally, a high positional accuracy in the connection between the discharge tube and the waveguides is required to implement a desirable discharge process.

SUMMARY OF THE INVENTION

It is an object of this invention to provide an improved microwave excited gas laser apparatus.

A first aspect of this invention provides a microwave excited gas laser apparatus comprising a single unit having at least first, second, third, and fourth waveguides, the first and second waveguides meeting at a first intersection, the third and fourth waveguides meeting at a second intersection; a discharge tube containing a laser medium gas and extending through the first and second intersections; and means for radiating microwaves into the first, second, third, and fourth waveguides; wherein the discharge tube in the first intersection is exposed to a microwave propagated along the first waveguide and a microwave propagated along the second waveguide, and the discharge tube in the second intersection is exposed to a microwave propagated along the third waveguide and a microwave propagated along the fourth waveguide.

A second aspect of this invention is based on the first aspect thereof, and provides a microwave excited gas laser apparatus wherein a direction of an electric field of the microwave applied to the discharge tube via the first waveguide and a direction of an electric field of the microwave applied to the discharge tube via the second waveguide are different from each other, and a direction of an electric field of the microwave applied to the discharge tube via the third waveguide and a direction of an electric field of the microwave applied to the discharge tube via the fourth waveguide are different from each other.

A third aspect of this invention provides a microwave excited gas laser apparatus comprising a single unit having first, second, third, and fourth waveguides, a first end of the first waveguide being connected to an end of the second waveguide, a second end of the first waveguide being connected to an end of the third waveguide, the second waveguide and the fourth waveguide meeting at a first intersection, the third waveguide and the fourth waveguide meeting at a second intersection; a first discharge tube containing a laser medium gas and extending through the first intersection; a second discharge tube containing a laser medium gas and extending through the second intersection; a single optical resonator in which the first and second discharge tubes are disposed; and magnetrons coupled to the first and fourth waveguides for radiating microwaves into the first and fourth waveguides respectively; wherein the first discharge tube in the first intersection is exposed to a microwave propagated along the second waveguide and a microwave propagated along the fourth waveguide, and the second discharge tube in the second intersection is exposed to a microwave propagated along the third waveguide and a microwave propagated along the fourth waveguide; and wherein a direction of an electric field of the microwave applied to the first discharge tube via the second waveguide and a direction of an electric field of the microwave applied to the first discharge tube via the fourth waveguide are different from each other, and a direction of an electric field of the microwave applied to the second discharge tube via the third waveguide and a direction of an electric field of the microwave applied to the second discharge tube via the fourth waveguide are different from each other.

A fourth aspect of this invention provides a microwave excited gas laser apparatus comprising a single unit having first, second, third, and fourth waveguides, a first end of the first waveguide being connected to a first end of the second waveguide, a second end of the first waveguide being connected to an end of the third waveguide, a second end of the second waveguide being connected to an end of the fourth waveguide, the third waveguide and the fourth waveguide meeting at an intersection; a discharge tube containing a laser medium gas and extending through the intersection; and a magnetron coupled to one waveguide among the first, second, third, and fourth waveguide for radiating a microwave into said one waveguide; wherein the discharge tube in the intersection is exposed to a microwave propagated along the third waveguide and a microwave propagated along the fourth waveguide, and a direction of an electric field of the microwave applied to the discharge tube via the third waveguide and a direction of an electric field of the microwave applied to the discharge tube via the fourth waveguide are substantially perpendicular to each other.

A fifth aspect of this invention is based on the fourth aspect thereof, and provides a microwave excited gas laser apparatus wherein the microwave is propagated from the magnetron to the discharge tube along two different paths in the first, second, third, and fourth waveguides, and a difference between effective lengths of the two different paths is equal to an integer times a quarter of a wavelength of the microwave.

A sixth aspect of this invention provides a microwave excited gas laser apparatus comprising an output mirror and an end mirror composing an optical resonator, the end mirror serving as a total reflection mirror with respect to laser light, the end mirror being at least transparent with respect to visible light; a discharge tube containing a laser medium gas and being located in the optical resonator; means for applying a microwave to a portion of the discharge tube in the optical resonator; and means located outside the optical resonator and facing the discharge tube via the end mirror for measuring a distribution of brightness of light caused by a discharge in the discharge tube.

A seventh aspect of this invention provides a microwave excited gas laser apparatus comprising a discharge tube containing a laser medium gas; means for applying a microwave to a portion of the discharge tube; and means located outside the discharge tube for measuring a brightness of discharge-caused light leaking from the discharge tube.

An eighth aspect of this invention is based on the seventh aspect thereof, and provides a microwave excited gas laser apparatus wherein the laser medium gas flows in the discharge tube, and said measuring means is located at a position downstream of the applying means as viewed in a direction of a flow of the laser medium gas in the discharge tube.

A ninth aspect of this invention provides a microwave excited gas laser apparatus comprising a single unit having first and second waveguides which meet at an intersection, the unit having first, second, third, and fourth corners at the intersection, the unit having first, second, third, and fourth apertures at the first, second, third, and fourth corners respectively; a discharge tube containing a laser medium gas and extending through the intersection; means for radiating microwaves into the first and second waveguides respectively, wherein the discharge tube in the intersection is exposed to a microwave propagated along the first waveguide and a microwave propagated along the second waveguide, and a direction of an electric field of the microwave applied to the discharge tube via the first waveguide and a direction of an electric field of the microwave applied to the discharge tube via the second waveguide are substantially perpendicular to each other; and first, second, third, and fourth photosensitive members located outside the intersection and facing the discharge tube in the intersection via the first, second, third, and fourth apertures respectively for measuring brightnesses of light caused by a discharge in the discharge tube.

DESCRIPTION OF THE PREFERRED EMBODIMENTS

A background-art microwave excited gas laser apparatus will be explained for a better understanding of this invention.

Figure 1:
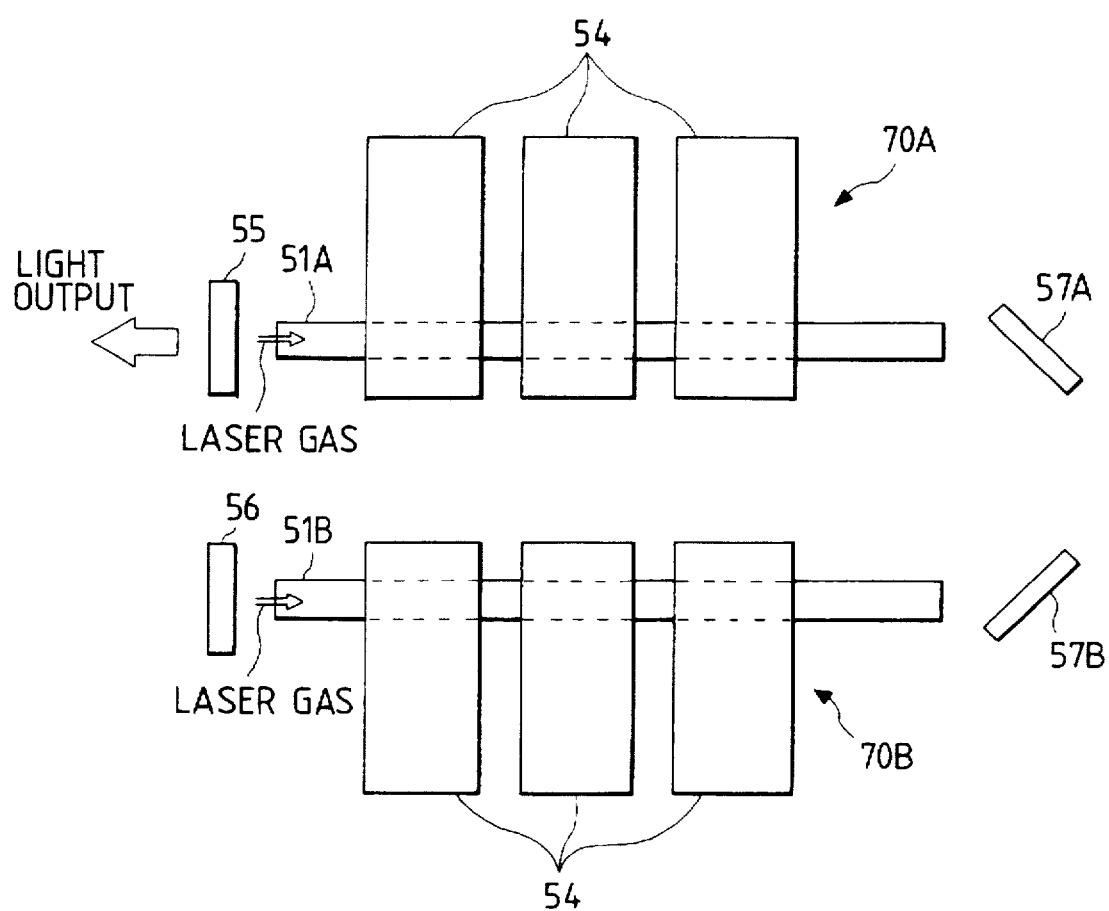
FIG. 1 is a diagrammatic plan view of a background-art microwave excited gas laser apparatus.

FIG. 1 shows a background-art microwave excited gas laser apparatus which is not prior art to this invention. The background-art microwave excited gas laser apparatus of FIG. 1 includes a first unit 70A and a second unit 70B.

The first unit 70A includes a discharge tube 51A filled with laser medium gas such as $CO_2$ gas. The discharge tube 51A forms a part of a closed-loop passage through which the laser medium gas is circulated by a pump or a blower (not shown). The discharge tube 51A has a circular cross-section. The discharge tube 51A extends through rectangular waveguides 54 arranged in parallel. The longitudinal axis (the optical axis) of the discharge tube 51A is perpendicular to the longitudinal axes of the waveguides 54.

The second unit 70B includes a discharge tube 51B filled with laser medium gas such as $CO_2$ gas. The discharge tube 51B forms a part of a closed-loop passage through which the laser medium gas is circulated by a pump or a blower (not shown). The discharge tube 51B has a circular cross-section. The discharge tube 51B extends through rectangular waveguides 54 arranged in parallel. The longitudinal axis (the optical axis) of the discharge tube 51B is perpendicular to the longitudinal axes of the waveguides 54.

It should be noted that a common pump or a common blower may be used to move the laser medium gas through the discharge tubes 51A and 51B.

In the background-art microwave excited gas laser apparatus of FIG. 1, the discharge tube 5 A of the first unit 70A is located between an output mirror 55 and a reflecting mirror 57A. The discharge tube 51B of the second unit 70B is located between an end mirror (a total reflection mirror) 56 and a reflecting mirror 57B. The discharge tubes 51A and 51B are parallel to each other.

The output mirror 55, the end mirror 56, and the reflecting mirrors 57A and 57B compose a U-shaped optical resonator divided into a first section, a second section, and a third section. The first section of the optical resonator extends between the output mirror 55 and the reflecting mirror 57A. The second section of the optical resonator extends between the reflecting mirrors 57A and 57B. The first and second sections of the optical resonator meet at the reflecting mirror 57A. The third section of the optical resonator extends between the reflecting mirror 57B and the end mirror 56. The second and third sections of the optical resonator meet at the reflecting mirror 57B. A laser light beam can be propagated from the optical resonator to an exterior via the output mirror 55.

In the background-art microwave excited gas laser apparatus of FIG. 1, the first and second units 70A and 70B have similar structures. Accordingly, only the first unit 70A will be explained in more detail.

Figure 2:
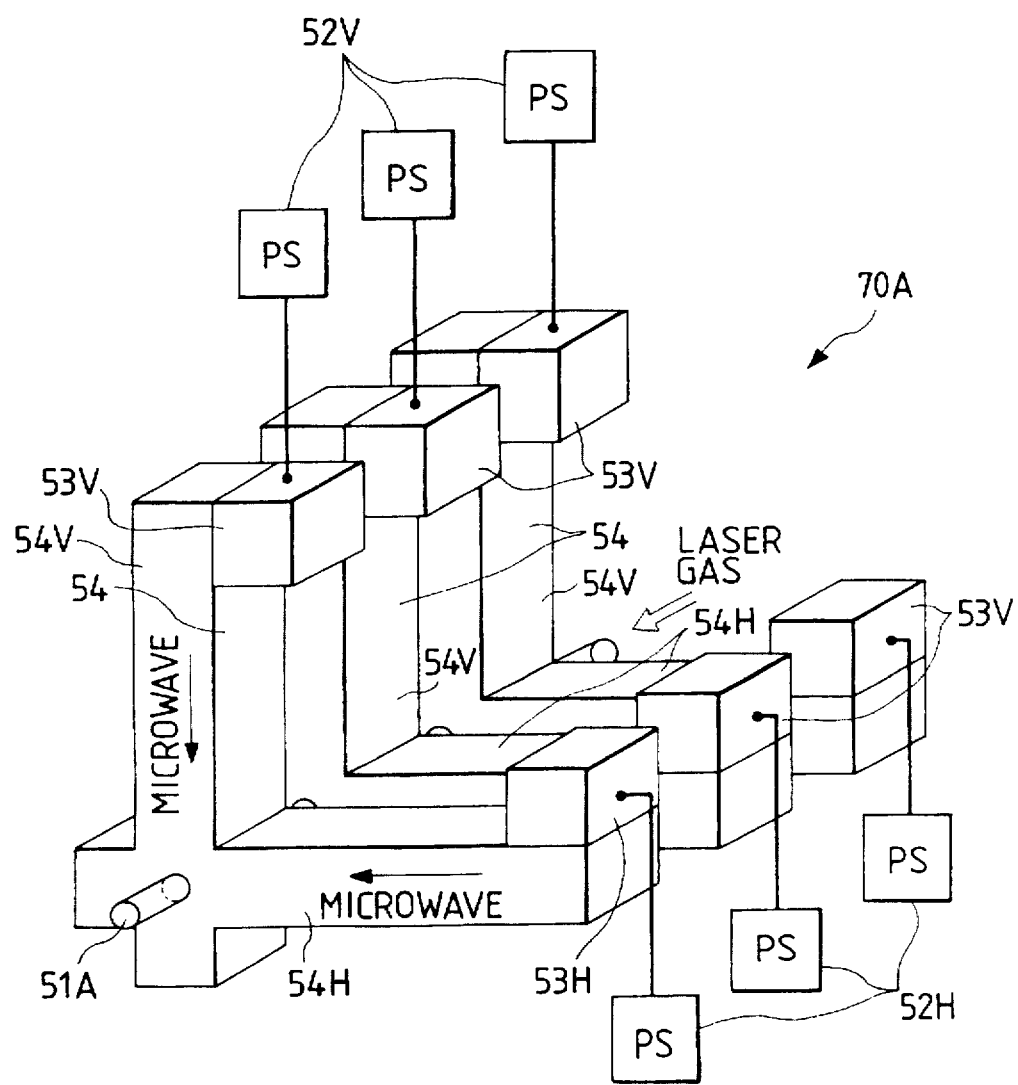
FIG. 2 is a diagrammatic perspective view of one unit in the background-art microwave excited gas laser apparatus of FIG. 1.

As shown in FIG. 2, each of the waveguides 54 in the first unit 70A has a vertical waveguide 54V and a horizontal waveguide 54H which meet at an intersection, and which are perpendicular to each other. The intersections of the waveguides 54 are located near lower ends of the vertical waveguides 54V and left-hand ends of the horizontal waveguides 54H. The discharge tube 51A extends through the centers of the intersections of the waveguides 54. The longitudinal axis of the discharge tube 51A is perpendicular to the longitudinal axes of the vertical waveguides 54V and the longitudinal axes of the horizontal waveguides 54H. The waveguides 54 align with each other along the direction of the longitudinal axis of the discharge tube 51A. The waveguides 54 are spaced by given intervals along the direction of the longitudinal axis of the discharge tube 51A.

As shown in FIG. 2, power supplies 52V are connected to magnetrons 53V respectively. The power supplies 52V serve to activate the magnetrons 53V respectively. The magnetrons 53V are coupled to upper ends of the vertical waveguides 54V respectively. The magnetrons 53V radiate microwaves into the vertical waveguides 54V respectively.

As shown in FIG. 2, power supplies 52H are connected to magnetrons 53H respectively. The power supplies 52H serve to activate the magnetrons 53H respectively. The magnetrons 53H are coupled to right-hand ends of the horizontal waveguides 54H respectively. The magnetrons 53H radiate microwaves into the horizontal waveguides 54H respectively.

The laser medium gas in each of the portions of the discharge tube 51A in the waveguides 54 is exposed to the microwave propagated along the vertical waveguide 54V and also the microwave propagated along the horizontal waveguide 54H. The discharge tube 51A and each of the waveguides 54 are designed so that, in the position of the discharge tube 51A, the direction of the electric field of the microwave propagated along the vertical waveguide 54V and the direction of the electric field of the microwave propagated along the horizontal waveguide 54H are different from each other. For example, the direction of the electric field of the microwave propagated along the vertical waveguide 54V and the direction of the electric field of the microwave propagated along the horizontal waveguide 54H are substantially perpendicular to each other.

The background-art microwave excited gas laser apparatus of FIGS. 1 and 2 operates as follows. The laser medium gas which flows in the discharge tubes 51A and 51B is exposed to the microwaves propagated along the waveguides 54. The laser medium gas is excited by the microwaves through a discharge process so that laser light is generated in the optical resonator. The different directions of the electric fields of the microwaves at the discharge tube 51A or 51B cause the laser medium gas to be excited uniformly in the cross-section of the discharge tube 51A or SiB. As a result, each discharge spreads uniformly in the cross-section of the discharge tube 51A or 51B. Such a uniform discharge is effective in providing stable and reliable laser oscillation. A beam of the laser light is emitted from the optical resonator via the output mirror 55.

Before normal operation of the background-art microwave excited gas laser apparatus of FIGS. 1 and 2, the positions of the waveguides 54 are adjusted relative to the related discharge tube 51A or 51B. In addition, adjustment is made as to the alignment among the waveguides 54 connected to the same discharge tube 51A or 51B. Furthermore, adjustment is made as to the spacing between the waveguides 54 connected to the same discharge tube 51A or 51B. Thus, the adjustment of the whole of the background art microwave excited gas laser apparatus of FIGS. 1 and 2 tends to have many steps.

First Embodiment

Figure 3:
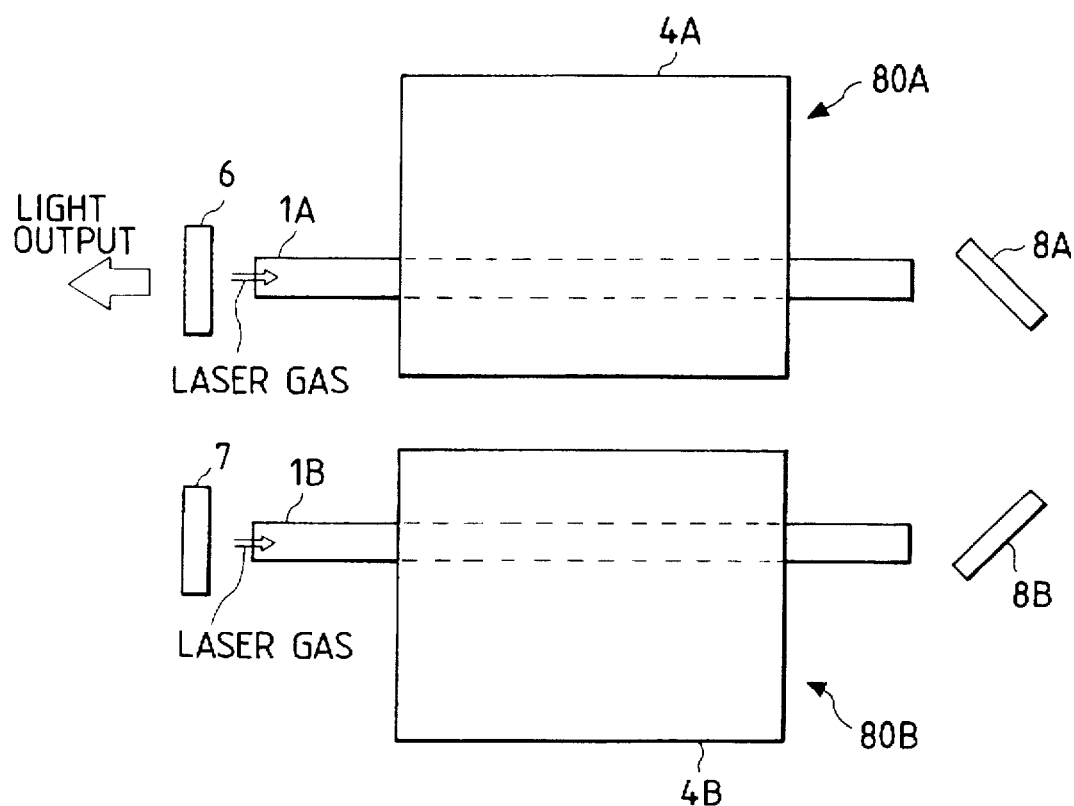
FIG. 3 is a diagrammatic plan view of a microwave excited gas laser apparatus according to a first embodiment of this invention.

FIG. 3 shows a microwave excited gas laser apparatus according to a first embodiment of this invention. The microwave excited gas laser apparatus of FIG. 3 includes a first unit 80A and a second unit 80B.

The first unit 80A includes a discharge tube 1A filled with laser medium gas such as $CO_2$ gas. The discharge tube 1A forms a part of a closed-loop passage through which the laser medium gas is circulated by a pump or a blower (not shown). The discharge tube 1A has a circular cross-section. The discharge tube 1A extends through a waveguide block 4A.

The second unit 80B includes a discharge tube 1B filled with laser medium gas such as $CO_2$ gas. The discharge tube 1B forms a part of a closed-loop passage through which the laser medium gas is circulated by a pump or a blower (not shown). The discharge tube 1B has a circular cross-section. The discharge tube 1B extends through a waveguide block 4B.

It should be noted that a common pump or a common blower may be used to move the laser medium gas through the discharge tubes 1A and 1B.

In the microwave excited gas laser apparatus of FIG. 3, the discharge tube 1A of the first unit 80A is located between an output mirror 6 and a reflecting mirror 8A. The discharge tube 1B of the second unit 80B is located between an end mirror (a total reflection mirror) 7 and a reflecting mirror 8B. The discharge tubes 1A and 1B are parallel to each other.

The output mirror 6, the end mirror 7, and the reflecting mirrors 8A and 8B compose a U-shaped optical resonator divided into a first section, a second section, and a third section. The first section of the optical resonator extends between the output mirror 6 and the reflecting mirror 8A. The second section of the optical resonator extends between the reflecting mirrors 8A and 8B. The first and second sections of the optical resonator meet at the reflecting mirror 8A. The third section of the optical resonator extends between the reflecting mirror 8B and the end mirror 7. The second and third sections of the optical resonator meet at the reflecting mirror 8B. A laser light beam can be propagated from the optical resonator to an exterior via the output mirror 6.

In the microwave excited gas laser apparatus of FIG. 3, the first and second units 80A and 80B have similar structures. Accordingly, only the first unit 80A will be explained in more detail.

Figure 4:
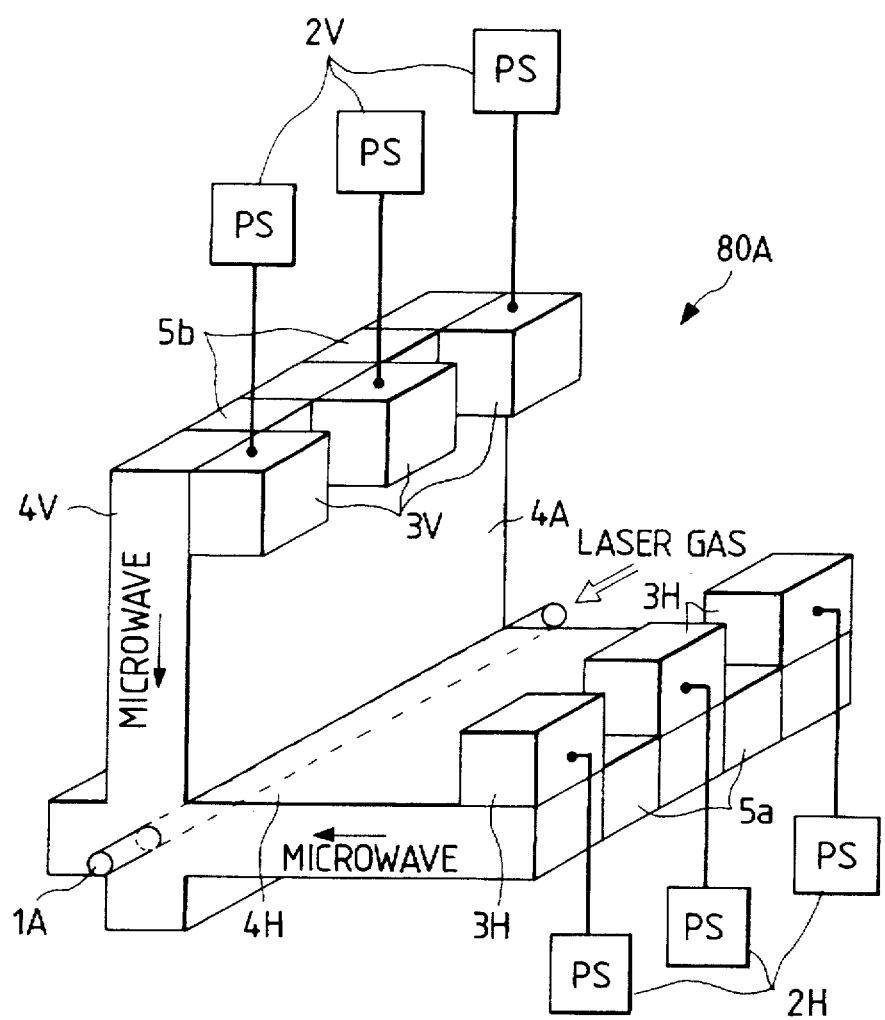
FIG. 4 is a diagrammatic perspective view of one unit in the microwave excited gas laser apparatus of FIG. 3.

As shown in FIG. 4, the waveguide block 4A in the first unit 80A has a vertical section 4V of a rectangular shape and a horizontal section 4H of a rectangular shape. The vertical section 4V and the horizontal section 4H meet at an intersection. The vertical section 4V and the horizontal section 4H are perpendicular to each other. The intersection of the waveguide block 4A extends along and near a lower edge of the vertical section 4V and a left-hand edge of the horizontal section 4H. The discharge tube 1A longitudinally extends through the center of the intersection of the waveguide block 4A. Specifically, the front and rear ends of the intersection of the waveguide block 4A have circular openings at their centers through which the discharge tube 1A coaxially extends.

Figure 5:
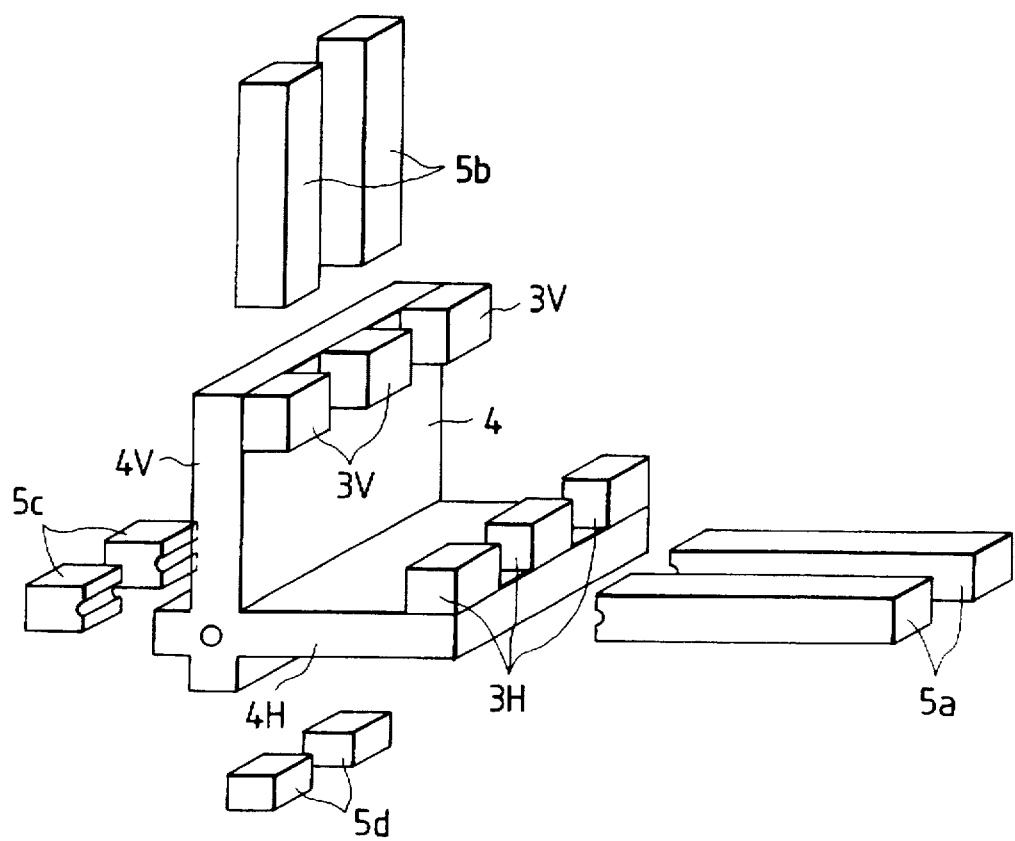
FIG. 5 is an exploded view of a waveguide block in FIG. 4.

As shown in FIGS. 4 and 5, the vertical section 4V of the waveguide block 4A has outer walls defining an inside space. Vertically-extending partition members 5b each composed of a bar with a rectangular cross-section are placed in the region of the inside space of the vertical section 4V above the discharge tube 1A. Partition members 5d each having a shape of a rectangular parallelepiped are placed in the region of the inside space of the vertical section 4V below the discharge tube 1A. The partition members 5d vertically align with the partition members 5b respectively. The partition members 5b are spaced from each other by a given interval. Similarly, the partition members 5d are spaced from each other by a given interval. The partition members 5b are spaced from the front and rear walls of the vertical section 4V. Similarly, the partition members 5d are spaced from the front and rear walls of the vertical section 4V. The outer walls of the vertical section 4V, the partition members 5b, and the partition members 5d form vertical waveguides having rectangular cross-sections respectively.

The horizontal section 4H of the waveguide block 4A has outer walls defining an inside space. The outer walls of the horizontal section 4H are connected to the outer walls of the vertical section 4V. The outer walls of the horizontal section 4H may be integral with the outer walls of the vertical section 4V. Horizontally-extending partition members 5a each composed of a bar with a rectangular cross-section are placed in the region of the inside space of the horizontal section 4H which extends rightward of the discharge tube 1A. Partition members 5c each having a shape of a rectangular parallelepiped are placed in the region of the inside space of the horizontal section 4H which extends leftward of the discharge tube 1A. The partition members 5c horizontally align with the partition members 5a respectively. The partition members 5a are spaced from each other by a given interval. Similarly, the partition members 5c are spaced from each other by a given interval. The partition members 5a are spaced from the front and rear walls of the horizontal section 4H. Similarly, the partition members 5c are spaced from the front and rear walls of the horizontal section 4H. The outer walls of the horizontal section 4H, the partition members 5a, and the partition members 5c form horizontal waveguides having rectangular cross-sections respectively.

The left-hand end surfaces of the partition members 5a have horizontally-extending grooves of a semicircular cross-section which accommodate portions of the discharge tube 1A. The right-hand end surfaces of the partition members 5c have horizontally-extending grooves of a semicircular cross-section which accommodate portions of the discharge tube 1A.

The vertical waveguides and the horizontal waveguides in the waveguide block 4A make pairs. In each waveguide pair, the vertical waveguide and the horizontal waveguide meet at an intersection, and are perpendicular to each other. Specifically, in each waveguide pair, the longitudinal axis of the vertical waveguide is perpendicular to the longitudinal axis of the horizontal waveguide. The discharge tube 1A extends through the centers of the intersections in the waveguide pairs. In each of the intersections, the longitudinal axis of the discharge tube 1A is perpendicular to the longitudinal axes of the vertical waveguide and the horizontal waveguide. Portions of the discharge tube 1A in the intersections of the waveguide pairs correspond to discharge regions respectively. The waveguide pairs, that is, the discharge regions, are spaced by equal intervals along the longitudinal axis of the discharge tube 1A.

As shown in FIG. 4, power supplies 2V are connected to magnetrons 3V respectively. The power supplies 2V serve to activate the magnetrons 3V respectively. The magnetrons 3V are coupled to upper ends of the vertical waveguides in the waveguide block 4A respectively. The magnetrons 3V radiate microwaves into the vertical waveguides respectively.

As shown in FIG. 4, power supplies 2H are connected to magnetrons 3H respectively. The power supplies 2H serve to activate the magnetrons 3H respectively. The magnetrons 3H are coupled to right-hand ends of the horizontal waveguides in the waveguide block 4A respectively. The magnetrons 3H radiate microwaves into the horizontal waveguides respectively.

The laser medium gas in each of the portions of the discharge tube 1A in the waveguide intersections is exposed to the microwave propagated along the vertical waveguide and also the microwave propagated along the horizontal waveguide. The discharge tube 1A and each of the waveguide pairs are designed so that, in the position of the discharge tube 1A, the direction of the electric field of the microwave propagated along the vertical waveguide and the direction of the electric field of the microwave propagated along the horizontal waveguide are different from each other. For example, the direction of the electric field of the microwave propagated along the vertical waveguide and the direction of the electric field of the microwave propagated along the horizontal waveguide are substantially perpendicular to each other.

The microwave excited gas laser apparatus of FIGS. 3–5 operates as follows. The laser medium gas which flows in the discharge tubes 1A and 1B is exposed to the microwaves propagated along the waveguides in the waveguide block 4A. The laser medium gas is excited by the microwaves through a discharge process so that laser light is generated in the optical resonator. The different directions of the electric fields of the microwaves at the discharge tube 1A or 1B cause the laser medium gas to be excited uniformly in the cross-section of the discharge tube 1A or 1B. As a result, each discharge spreads uniformly in the cross-section of the discharge tube 1A or 1B. Such a uniform discharge is effective in providing stable and reliable laser oscillation. A beam of the laser light is emitted from the optical resonator via the output mirror 6.

The vertical waveguides and the horizontal waveguides are formed in the common waveguide block 4A. The adjustment of the position of the waveguide block 4A relative to the discharge tube 1A automatically provides the adjustment of the positions of the vertical waveguides and the horizontal waveguides relative to the discharge tube 1A. Accordingly, the total number of steps in the adjustment of the microwave excited laser apparatus of FIGS. 3–5 is smaller than the total number of steps in the adjustment of the background-art microwave excited gas laser apparatus of FIGS. 1 and 2.

It should be noted that the discharge regions may be spaced by different intervals. In addition, the partition members 5a, 5b, 5c, and 5d may be cooled by liquid coolant to provide a high laser output.

Second Embodiment

A second embodiment of this invention is similar to the embodiment of FIGS. 3–5 except for design changes indicated hereinafter. First and second units in the second embodiment differ from the first and second units 80A and 80B in the embodiment of FIGS. 3–5. The first and second units in the second embodiment having similar structures. Accordingly, only the first unit in the second embodiment will be explained.

Figure 6:
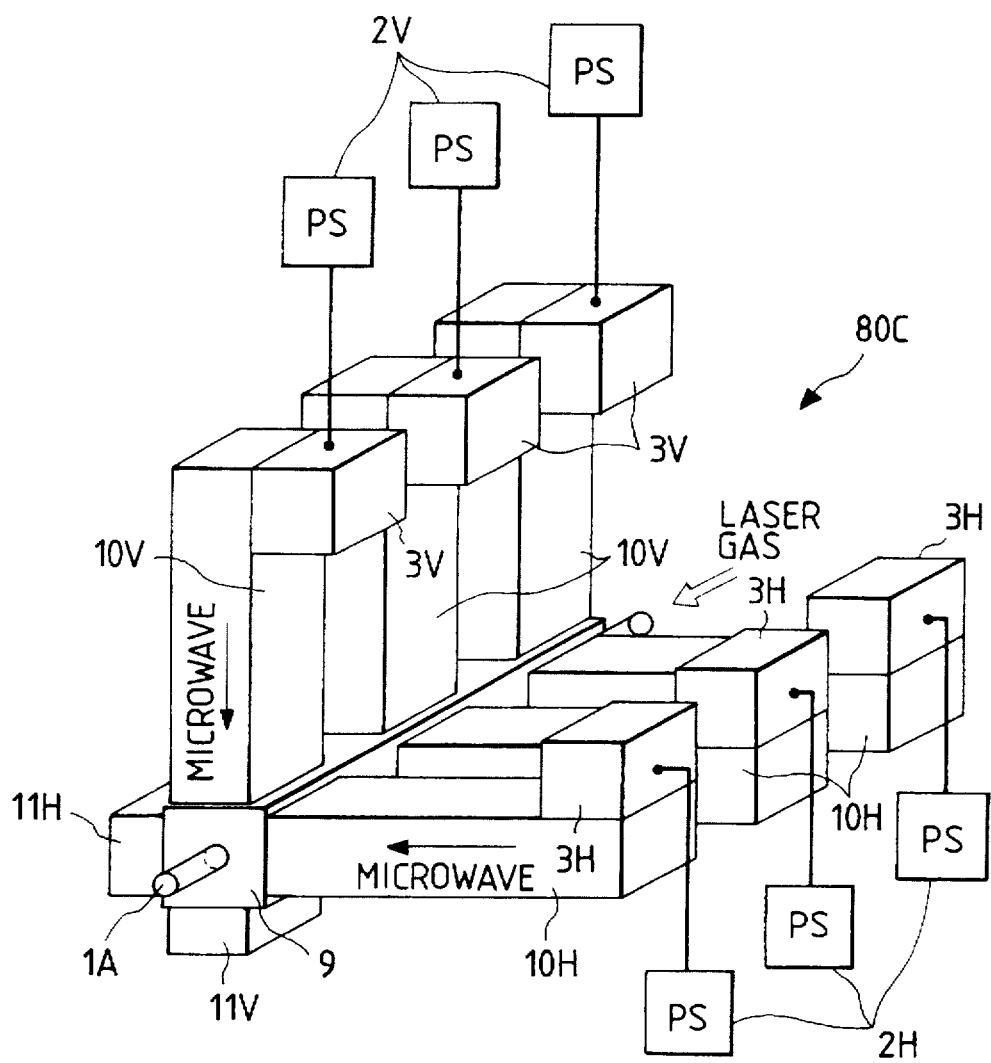
FIG. 6 is a diagrammatic perspective view of one unit in a microwave excited gas laser apparatus according to a second embodiment of this invention.

FIG. 6 shows the first unit in the second embodiment which is denoted by the reference character "80C". The first unit 80C includes an elongated discharge block 9 having a square or rectangular cross-section. A discharge tube 1A longitudinally extends through the center of the discharge block 9. The discharge block 9 has inside spaces for intersections between horizontal waveguides and vertical waveguides.

First horizontal waveguide members 10H extend rightward from the discharge block 9. Second horizontal waveguide members 11H extend leftward from the discharge block 9. The first horizontal waveguide members 10H and the second horizontal waveguide members 11H are welded to the discharge block 9. The first horizontal waveguide members 10H align with the second horizontal waveguide members 11H respectively. The first horizontal waveguide members 10H and the second horizontal waveguide members 11H form horizontal waveguides.

First vertical waveguide members 10V extend upward from the discharge block 9. Second vertical waveguide members 11V extend downward from the discharge block 9. The first vertical waveguide members 10V and the second vertical waveguide members 11V are welded to the discharge block 9. The first vertical waveguide members 10V align with the second vertical waveguide members 11V respectively. The first vertical waveguide members 10V and the second vertical waveguide members 11V form vertical waveguides.

Third Embodiment

Figure 7:
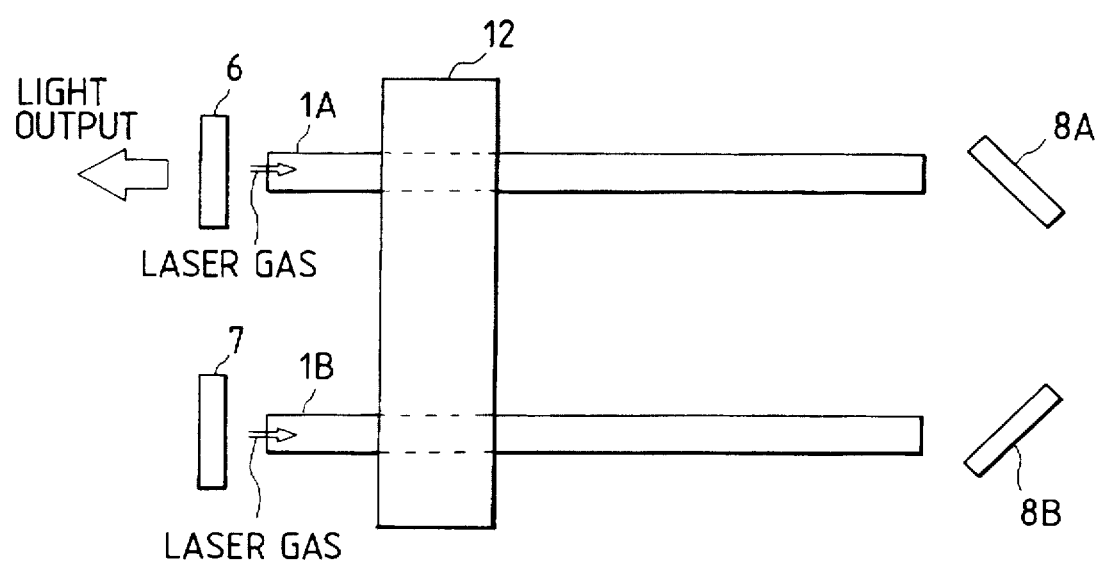
FIG. 7 is a diagrammatic plan view of a microwave excited gas laser apparatus according to a third embodiment of this invention.

FIG. 7 shows a microwave excited gas laser apparatus according to a third embodiment of this invention. The microwave excited gas laser apparatus of FIG. 7 includes a discharge tube 1A filled with laser medium gas such as $CO_2$ gas. The discharge tube 1A forms a part of a closed-loop passage through which the laser medium gas is circulated by a pump or a blower (not shown). The discharge tube 1A has a circular cross-section. The discharge tube 1A extends through a waveguide block 12.

The microwave excited gas laser apparatus of FIG. 7 also includes a discharge tube 1B filled with laser medium gas such as $CO_2$ gas. The discharge tube 1B forms a part of a closed-loop passage through which the laser medium gas is circulated by a pump or a blower (not shown). The discharge tube 1B has a circular cross-section. The discharge tube 1B extends through the waveguide block 12.

It should be noted that a common pump or a common blower may be used to move the laser medium gas through the discharge tubes 1A and 1B.

In the microwave excited gas laser apparatus of FIG. 7, the discharge tube 1A is located between an output mirror 6 and a reflecting mirror 8A. The discharge tube 1B is located between an end mirror (a total reflection mirror) 7 and a reflecting mirror 8B. The discharge tubes 1A and 1B are parallel to each other.

The output mirror 6, the end mirror 7, and the reflecting mirrors 8A and 8B compose a U-shaped optical resonator divided into a first section, a second section, and a third section. The first section of the optical resonator extends between the output mirror 6 and the reflecting mirror 8A. The second section of the optical resonator extends between the reflecting mirrors 8A and 8B. The first and second sections of the optical resonator meet at the reflecting mirror 8A. The third section of the optical resonator extends between the reflecting mirror 8B and the end mirror 7. The second and third sections of the optical resonator meet at the reflecting mirror 8B. A laser light beam can be propagated from the optical resonator to an exterior via the output mirror 6.

Figure 8:
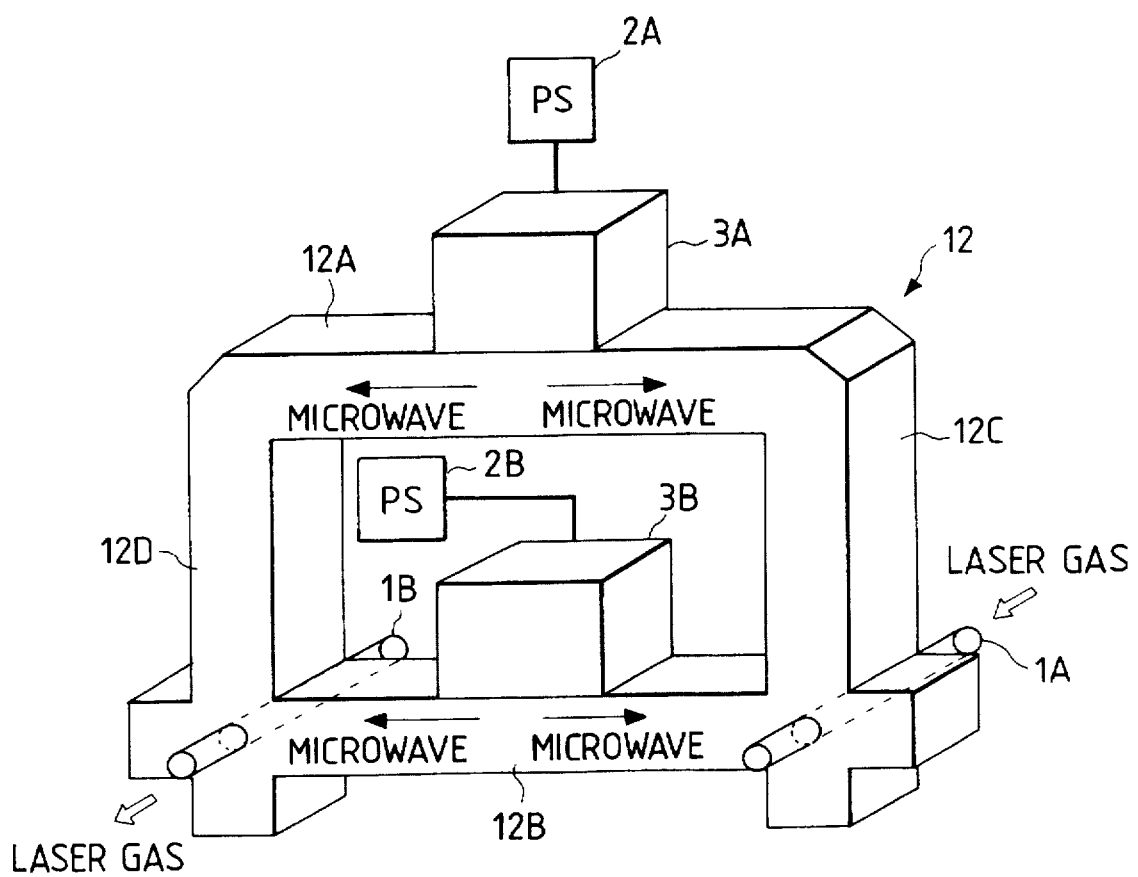
FIG. 8 is a diagrammatic perspective view of a waveguide block and related devices in the microwave excited gas laser apparatus of FIG. 7.

As shown in FIG. 8, the waveguide block 12 has an upper horizontal waveguide 12A, a lower horizontal waveguide 12B, a right-hand vertical waveguide 12C, and a left-hand vertical waveguide 12D. The upper horizontal waveguide 12A, the lower horizontal waveguide 12B, the right-hand vertical waveguide 12C, and the left-hand vertical waveguide 12D are of a rectangular cross-section. The right-hand vertical waveguide 12C is connected to the upper horizontal waveguide 12A and the lower horizontal waveguide 12B. Also, the left-hand vertical waveguide 12D is connected to the upper horizontal waveguide 12A and the lower horizontal waveguide 12B.

The right-hand vertical waveguide 12C extends downward from a right-hand end of the upper horizontal waveguide 12A. The right-hand vertical waveguide 12C meets the lower horizontal waveguide 12B at an intersection which is located near a lower end of the right-hand vertical waveguide 12C and a right-hand end of the lower horizontal waveguide 12B. The discharge tube 1A extends through the center of the intersection between the right-hand vertical waveguide 12C and the lower horizontal waveguide 12B. Specifically, the front and rear ends of the intersection have circular openings at their centers through which the discharge tube 1A coaxially extends. The longitudinal axis of the right-hand vertical waveguide 12C is perpendicular to the longitudinal axis of the lower horizontal waveguide 12B. In the intersection, the longitudinal axis of the discharge tube 1A is perpendicular to the longitudinal axes of the lower horizontal waveguide 12B and the right-hand vertical waveguide 12C. The portion of the discharge tube 1A in the intersection between the lower horizontal waveguide 12B and the right-hand vertical waveguide 12C corresponds to a discharge region.

The left-hand vertical waveguide 12D extends downward from a left-hand end of the upper horizontal waveguide 12A. The left-hand vertical waveguide 12D meets the lower horizontal waveguide 12B at an intersection which is located near a lower end of the lefthand vertical waveguide 12D and a left-hand end of the lower horizontal waveguide 12B. The discharge tube 1B extends through the center of the intersection between the left-hand vertical waveguide 12D and the lower horizontal waveguide 12B. Specifically, the front and rear ends of the intersection have circular openings at their centers through which the discharge tube 1B coaxially extends. The longitudinal axis of the left-hand vertical waveguide 12D is perpendicular to the longitudinal axis of the lower horizontal waveguide 12B. In the intersection, the longitudinal axis of the discharge tube 1B is perpendicular to the longitudinal axes of the lower horizontal waveguide 12B and the left-hand vertical waveguide 12D. The portion of the discharge tube 1B in the intersection between the lower horizontal waveguide 12B and the left-hand vertical waveguide 12D corresponds to a discharge region.

The upper horizontal waveguide 12A and the lower horizontal waveguide 12B are parallel to each other. The upper horizontal waveguide 12A and the lower horizontal waveguide 12B are spaced from each other. The right-hand vertical waveguide 12C and the left-hand vertical waveguide 12D are parallel to each other. The right-hand vertical waveguide 12C and the left-hand vertical waveguide 12D are spaced from each other.

As shown in FIG. 8, a power supply 2A is connected to a magnetron 3A. The power supply 2A serves to activate the magnetron 3A. The magnetron 3A is coupled to the halfway point or the center of the upper horizontal waveguide 12A. The magnetron 3A radiates microwave into the upper horizontal waveguide 12A. The microwave is propagated in two opposite directions along the upper horizontal waveguide 12A, entering the right-hand vertical waveguide 12C and the left-hand vertical waveguide 12D before reaching the discharge tubes 1A and 1B.

A power supply 2B is connected to a magnetron 3B. The power supply 2B serves to activate the magnetron 3B. The magnetron 3B is coupled to the halfway point or the center of the lower horizontal waveguide 12B. The magnetron 3B radiates microwave into the lower horizontal waveguide 12B. The microwave is propagated in two opposite directions along the lower horizontal waveguide 12B, reaching the discharge tubes 1A and 1B.

The laser medium gas in the portion of the discharge tube 1A in the waveguide block 12 is exposed to the microwave propagated along the lower horizontal waveguide 12B and also the microwave propagated along the right-hand vertical waveguide 12C. The waveguide block 12 and the discharge tube 1A are designed so that, in the position of the discharge tube 1A, the direction of the electric field of the microwave propagated along the lower horizontal waveguide 12B and the direction of the electric field of the microwave propagated along the right-hand vertical waveguide 12C are different from each other. For example, the direction of the electric field of the microwave propagated along the lower horizontal waveguide 12B and the direction of the electric field of the microwave propagated along the right-hand vertical waveguide 12C are substantially perpendicular to each other.

The laser medium gas in the portion of the discharge tube 1B in the waveguide block 12 is exposed to the microwave propagated along the lower horizontal waveguide 12B and also the microwave propagated along the left-hand vertical waveguide 12D. The waveguide block 12 and the discharge tube 1B are designed so that, in the position of the discharge tube 1B, the direction of the electric field of the microwave propagated along the lower horizontal waveguide 12B and the direction of the electric field of the microwave propagated along the left-hand vertical waveguide 12D are different from each other. For example, the direction of the electric field of the microwave propagated along the lower horizontal waveguide 12B and the direction of the electric field of the microwave propagated along the left-hand vertical waveguide 12D are substantially perpendicular to each other.

The microwave excited gas laser apparatus of FIGS. 7 and 8 operates as follows. The laser medium gas which flows in the discharge tubes 1A and 1B is exposed to the microwaves propagated along the waveguides in the waveguide block 12. The laser medium gas is excited by the microwaves through a discharge process so that laser light is generated in the optical resonator. The different directions of the electric fields of the microwaves at the discharge tube 1A or 1B cause the laser medium gas to be excited uniformly in the cross-section of the discharge tube 1A or 1B. As a result, each discharge spreads uniformly in the cross-section of the discharge tube 1A or 1B. Such a uniform discharge is effective in providing stable and reliable laser oscillation. A beam of the laser light is emitted from the optical resonator via the output mirror 6.

The microwave excited gas laser apparatus of FIGS. 7 and 8 is effective in reducing the number of magnetrons.

It should be noted that at least one combination of a waveguide block, magnetrons, and power supplies, which is similar to the combination of the waveguide block 12, the magnetrons 3A and 3B, and the power supplies 2A and 2B, may be additionally provided on the discharge tubes 1A and 1B.

Fourth Embodiment

Figure 9:
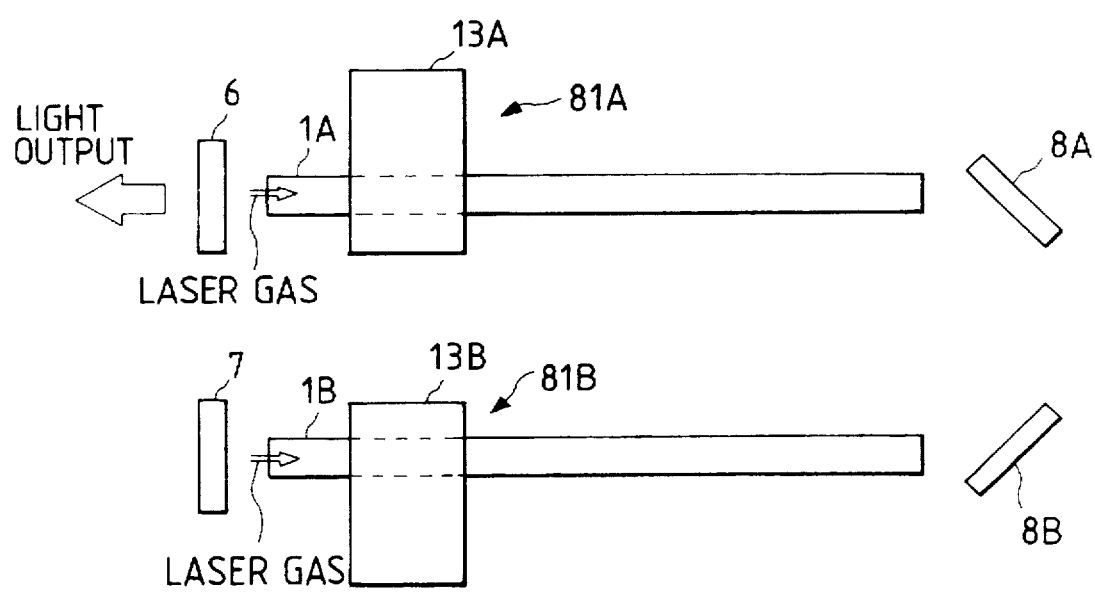
FIG. 9 is a diagrammatic plan view of a microwave excited gas laser apparatus according to a fourth embodiment of this invention.

FIG. 9 shows a microwave excited gas laser apparatus according to a fourth embodiment of this invention. The microwave excited gas laser apparatus of FIG. 9 includes a first unit 8 1A and a second unit 81B.

The first unit 81A includes a discharge tube 1A filled with laser medium gas such as $CO_2$ gas. The discharge tube 1A forms a part of a closed-loop passage through which the laser medium gas is circulated by a pump or a blower (not shown). The discharge tube 1A has a circular cross-section. The discharge tube 1A extends through a waveguide block 13A.

The second unit 81B includes a discharge tube 1 B filled with laser medium gas such as $CO_2$ gas. The discharge tube 1B forms a part of a closed-loop passage through which the laser medium gas is circulated by a pump or a blower (not shown). The discharge tube 1B has a circular cross-section. The discharge tube 1B extends through a waveguide block 13B.

It should be noted that a common pump or a common blower may be used to move the laser medium gas through the discharge tubes 1A and 1B.

In the microwave excited gas laser apparatus of FIG. 9, the discharge tube 1A of the first unit 81A is located between an output mirror 6 and a reflecting mirror 8A. The discharge tube 1B of the second unit 81B is located between an end mirror (a total reflection mirror) 7 and a reflecting mirror 8B. The discharge tubes 1A and 1B are parallel to each other.

The output mirror 6, the end mirror 7, and the reflecting mirrors 8A and 8B compose a U-shaped optical resonator divided into a first section, a second section, and a third section. The first section of the optical resonator extends between the output mirror 6 and the reflecting mirror 8A. The second section of the optical resonator extends between the reflecting mirrors 8A and 8B. The first and second sections of the optical resonator meet at the reflecting mirror 8A. The third section of the optical resonator extends between the reflecting mirror 8B and the end mirror 7. The second and third sections of the optical resonator meet at the reflecting mirror 8B. A laser light beam can be propagated from the optical resonator to an exterior via the output mirror 6.

In the microwave excited gas laser apparatus of FIG. 9, the first and second units 81A and 81B have similar structures. Accordingly, only the first unit 8 1A will be explained in more detail.

Figure 10:
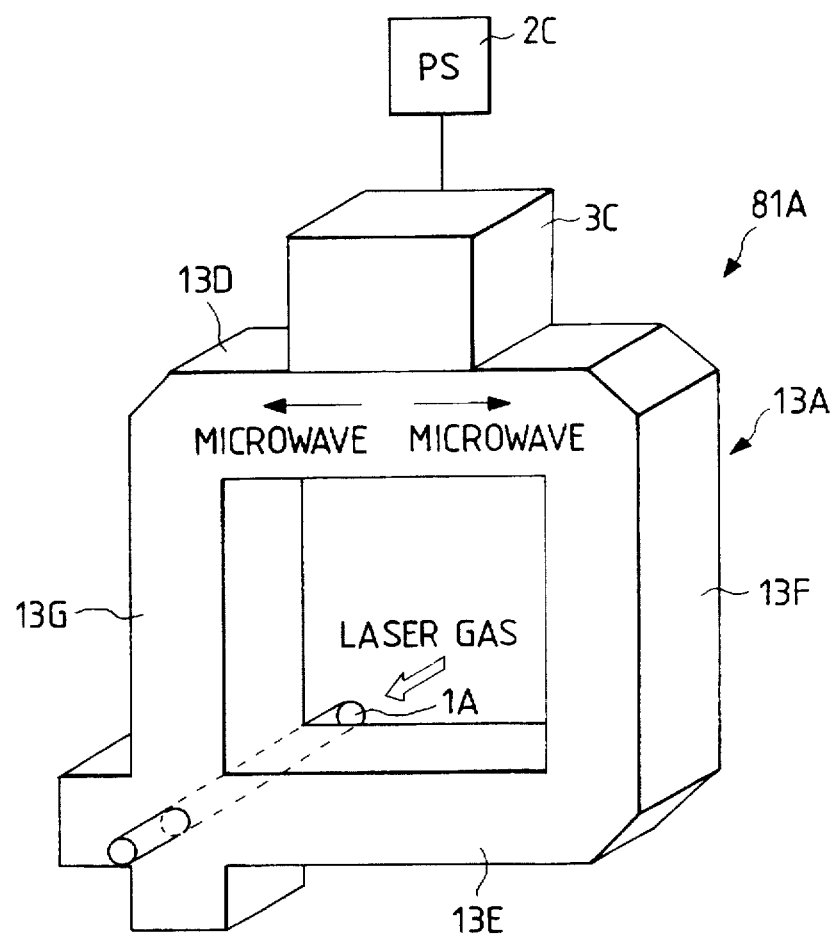
FIG. 10 is a diagrammatic perspective view of one unit in the microwave excited gas laser apparatus of FIG. 9.

As shown in FIG. 10, the waveguide block 13A has an upper horizontal waveguide 13D, a lower horizontal waveguide 13E, a right-hand vertical waveguide 13F, and a left-hand vertical waveguide 13G. The upper horizontal waveguide 13D, the lower horizontal waveguide 13E, the right-hand vertical waveguide 13F, and the left-hand vertical waveguide 13G are of a rectangular crosssection.

The right-hand vertical waveguide 13F is connected between a right-hand end of the upper horizontal waveguide 13D and a right-hand end of the lower horizontal waveguide 13E. The left-hand vertical waveguide 13G extends downward from a left-hand end of the upper horizontal waveguide 13D. The left-hand vertical waveguide 13G meets the lower horizontal waveguide 13E at an intersection which is located near a lower end of the left-hand vertical waveguide 13G and a left-hand end of the lower horizontal waveguide 13E. The discharge tube 1A extends through the center of the intersection between the left-hand vertical waveguide 13G and the lower horizontal waveguide 13E. Specifically, the front and rear ends of the intersection have circular openings at their centers through which the discharge tube 1A coaxially extends. The longitudinal axis of the left-hand vertical waveguide 13G is perpendicular to the longitudinal axis of the lower horizontal waveguide 13E. In the intersection, the longitudinal axis of the discharge tube 1A is perpendicular to the longitudinal axes of the lower horizontal waveguide 13E and the left-hand vertical waveguide 13G. The portion of the discharge tube 1A in the intersection between the lower horizontal waveguide 13E and the left-hand vertical waveguide 13G corresponds to a discharge region.

The upper horizontal waveguide 13D and the lower horizontal waveguide 13E are parallel to each other. The upper horizontal waveguide 13D and the lower horizontal waveguide 13E are spaced from each other. The right-hand vertical waveguide 13F and the left-hand vertical waveguide 13G are parallel to each other. The right-hand vertical waveguide 13F and the left-hand vertical waveguide 13G are spaced from each other.

As shown in FIG. 10, a power supply 2C is connected to a magnetron 3C. The power supply 2C serves to activate the magnetron 3C. The magnetron 3C is coupled to the upper horizontal waveguide 13D. The magnetron 3C radiates microwave into the upper horizontal waveguide 13D. The microwave is propagated in two opposite directions along the upper horizontal waveguide 13D, entering the right-hand vertical waveguide 13F and the left-hand vertical waveguide 13G. The microwave which has entered the right-hand vertical waveguide 13F travels to the lower horizontal waveguide 13E before being propagated to the discharge tube 1A. The microwave which has entered the left-hand vertical waveguide 13G is propagated to the discharge tube 1A. In this way, the microwave is propagated from the magnetron 3C to the discharge tube 1A via two different paths. The position of the connection of the magnetron 3C to the waveguide block 13A is chosen so that the difference between the effective lengths of the two microwave propagation paths will be equal to a quarter of the wavelength of the microwave.

The laser medium gas in the portion of the discharge tube 1A in the waveguide block 13A is exposed to the microwave propagated along the lower horizontal waveguide 13E and also the microwave propagated along the left-hand vertical waveguide 13G. The waveguide block 13A and the discharge tube 1A are designed so that, in the position of the discharge tube 1A, the direction of the electric field of the microwave propagated along the lower horizontal waveguide 13E and the direction of the electric field of the microwave propagated along the left-hand vertical waveguide 13G are different from each other. For example, the direction of the electric field of the microwave propagated along the lower horizontal waveguide 13E and the direction of the electric field of the microwave propagated along the left-hand vertical waveguide 13G are substantially perpendicular to each other.

The microwave excited gas laser apparatus of FIGS. 9 and 10 operates as follows. The laser medium gas which flows in the discharge tubes 1A and 1B is exposed to the microwaves propagated along the waveguides in the waveguide blocks 13A and 13B. The laser medium gas is excited by the microwaves through a discharge process so that laser light is generated in the optical resonator. As previously explained, the microwaves applied to the discharge tube 1A or 1B travel from the common magnetron via the two different propagation paths having effective lengths, the difference between which is equal to a quarter of the wavelength of the microwave. In addition, the directions of the electric fields of the microwaves applied to the discharge tube 1A or 1B are different from each other. Accordingly, the electric field of a resultant of the microwaves applied to the discharge tube 1A or 1B moves in a circular locus or trajectory. Thus, the laser medium gas is excited uniformly in the cross-section of the discharge tube 1A or 1B. As a result, each discharge spreads uniformly in the cross-section of the discharge tube 1A or 1B. Such a uniform discharge is effective in providing stable and reliable laser oscillation. A beam of the laser light is emitted from the optical resonator via the output mirror 6.

It should be noted that the difference between the effective lengths of the two microwave propagation paths in the waveguide block 13A or 13B may be equal to an integer times a quarter of the wavelength of the microwave. In addition, the effective lengths of the two microwave propagation paths in the waveguide block 13A or 13B may be different from a quarter of the wavelength of the microwave.

Fifth Embodiment

Figure 11:
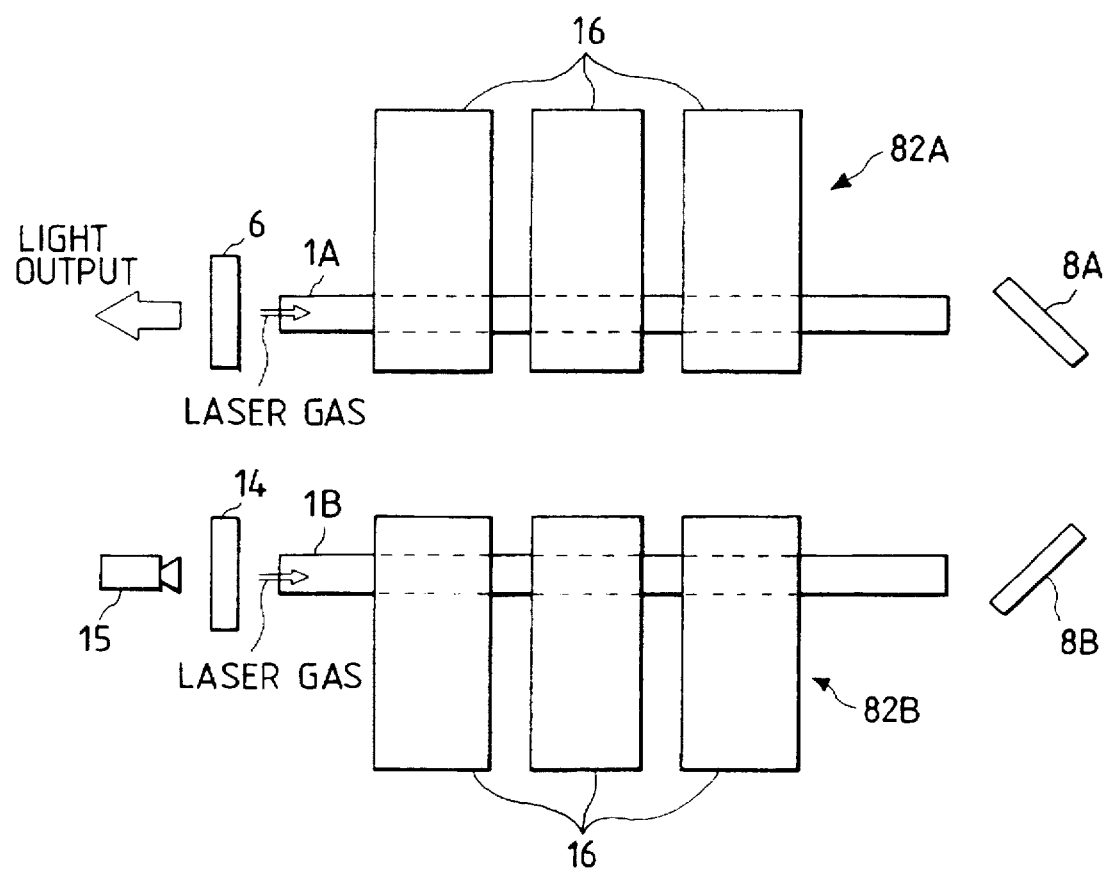
FIG. 11 is a diagrammatic plan view of a microwave excited gas laser apparatus according to a fifth embodiment of this invention.

FIG. 11 shows a microwave excited gas laser apparatus according to a fifth embodiment of this invention. The microwave excited gas laser apparatus of FIG. 11 includes a first unit 82A and a second unit 82B.

The first unit 82A includes a discharge tube 1A filled with laser medium gas such as $CO_2$ gas. The discharge tube 1A forms a part of a closed-loop passage through which the laser medium gas is circulated by a pump or a blower (not shown). The discharge tube 1A has a circular cross-section. The discharge tube 1A extends through rectangular waveguides 16 arranged in parallel. The longitudinal axis (the optical axis) of the discharge tube 1A is perpendicular to the longitudinal axes of the waveguides 16.

The second unit 82B includes a discharge tube 1B filled with laser medium gas such as $CO_2$ gas. The discharge tube 1B forms a part of a closed-loop passage through which the laser medium gas is circulated by a pump or a blower (not shown). The discharge tube 1B has a circular cross-section. The discharge tube 1B extends through rectangular waveguides 16 arranged in parallel. The longitudinal axis (the optical axis) of the discharge tube 1B is perpendicular to the longitudinal axes of the waveguides 16.

It should be noted that a common pump or a common blower may be used to move the laser medium gas through the discharge tubes 1A and 1B.

In the microwave excited gas laser apparatus of FIG. 11, the discharge tube 1A of the first unit 82A is located between an output mirror 6 and a reflecting mirror 8A. The discharge tube 1B of the second unit 82B is located between an end mirror 14 and a reflecting mirror 8B. The discharge tubes 1A and 1B are parallel to each other.

The output mirror 6, the end mirror 14, and the reflecting mirrors 8A and 8B compose a U-shaped optical resonator divided into a first section, a second section, and a third section. The first section of the optical resonator extends between the output mirror 6 and the reflecting mirror 8A. The second section of the optical resonator extends between the reflecting mirrors 8A and 8B. The first and second sections of the optical resonator meet at the reflecting mirror 8A. The third section of the optical resonator extends between the reflecting mirror 8B and the end mirror 14. The second and third sections of the optical resonator meet at the reflecting mirror 8B. A laser light beam can be propagated from the optical resonator to an exterior via the output mirror 6.

The end mirror 14 serves as a total reflection mirror with respect to the laser light. The end mirror 14 is at least partially transparent with respect to visible light generated by discharge in the discharge tubes 1A and 1B. The end mirror 14 includes a layer of, for example, zinc selenide. A camera 15 of, for example, a CCD type is located outside the optical resonator. The camera 15 faces the end mirror 14. The camera 15 longitudinally aligns with the discharge tube 1B. Since the end mirror 14 is transparent to visible light, the camera 15 faces the discharge tube 1B via the end mirror 14. The camera 15 is used in monitoring a distribution of the brightness of light caused by each discharge in the discharge tubes 1A and 1B.

In the microwave excited gas laser apparatus of FIG. 11, the first and second units 82A and 82B have similar structures. Accordingly, only the first unit 82A will be explained in more detail.

Figure 12:
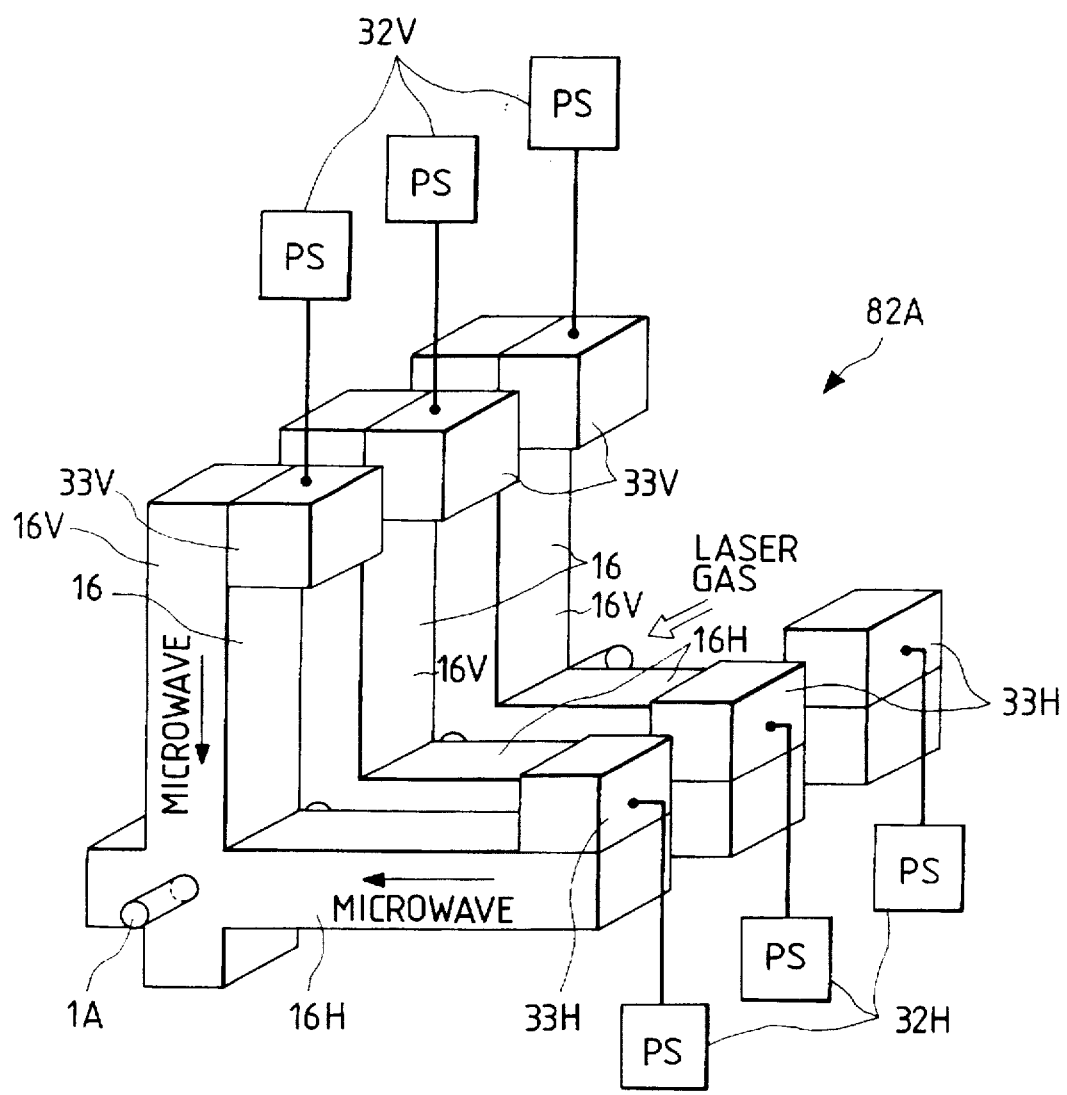
FIG. 12 is a diagrammatic perspective view of one unit in the microwave excited gas laser apparatus of FIG. 11.

As shown in FIG. 12, each of the waveguides 16 in the first unit 82A has a vertical waveguide 16V and a horizontal waveguide 16H which meet at an intersection, and which are perpendicular to each other. The intersections of the waveguides 16 are located near lower ends of the vertical waveguides 16V and left-hand ends of the horizontal waveguides 16H. The discharge tube 1A extends through the centers of the intersections of the waveguides 16. The longitudinal axis of the discharge tube 1A is perpendicular to the longitudinal axes of the vertical waveguides 16V and the longitudinal axes of the horizontal waveguides 16H. The waveguides 16 align with each other along the direction of the longitudinal axis of the discharge tube 1A. The waveguides 16 are spaced by given intervals along the direction of the longitudinal axis of the discharge tube 1A.

As shown in FIG. 12, power supplies 32V are connected to magnetrons 33V respectively. The power supplies 32V serve to activate the magnetrons 33V respectively. The magnetrons 33V are coupled to upper ends of the vertical waveguides 16V respectively. The magnetrons 33V radiate microwaves into the vertical waveguides 16V respectively.

As shown in FIG. 12, power supplies 32H are connected to magnetrons 33H respectively. The power supplies 32H serve to activate the magnetrons 33H respectively. The magnetrons 33H are coupled to right-hand ends of the horizontal waveguides 16H respectively. The magnetrons 33H radiate microwaves into the horizontal waveguides 16H respectively.

The laser medium gas in each of the portions of the discharge tube 1A in the waveguides 16 is exposed to the microwave propagated along the vertical waveguide 16V and also the microwave propagated along the horizontal waveguide 16H. The discharge tube 1A and each of the waveguides 16 are designed so that, in the position of the discharge tube 1A, the direction of the electric field of the microwave propagated along the vertical waveguide 16V and the direction of the electric field of the microwave propagated along the horizontal waveguide 16H are different from each other. For example, the direction of the electric field of the microwave propagated along the vertical waveguide 16V and the direction of the electric field of the microwave propagated along the horizontal waveguide 16H are substantially perpendicular to each other.

The microwave excited gas laser apparatus of FIGS. 11 and 12 operates as follows. The laser medium gas which flows in the discharge tubes 1A and 1B is exposed to the microwaves propagated along the waveguides 16. The laser medium gas is excited by the microwaves through a discharge process so that laser light is generated in the optical resonator. The different directions of the electric fields of the microwaves at the discharge tube 1A or 1B cause the laser medium gas to be excited uniformly in the cross-section of the discharge tube 1A or 1B. As a result, each discharge spreads uniformly in the cross-section of the discharge tube 1A or 1B. Such a uniform discharge is effective in providing stable and reliable laser oscillation. A beam of the laser light is emitted from the optical resonator via the output mirror 6.

Before normal operation of the microwave excited gas laser apparatus of FIGS. 11 and 12, a discharge adjustment process is carried out. During the discharge adjustment process, specified parts of the microwave excited gas laser apparatus are adjusted to provide desirable conditions of discharges in the discharge tubes 1A and 1B while a distribution of the brightness of light caused by each discharge is monitored by the camera 15.

Sixth Embodiment

Figure 13:
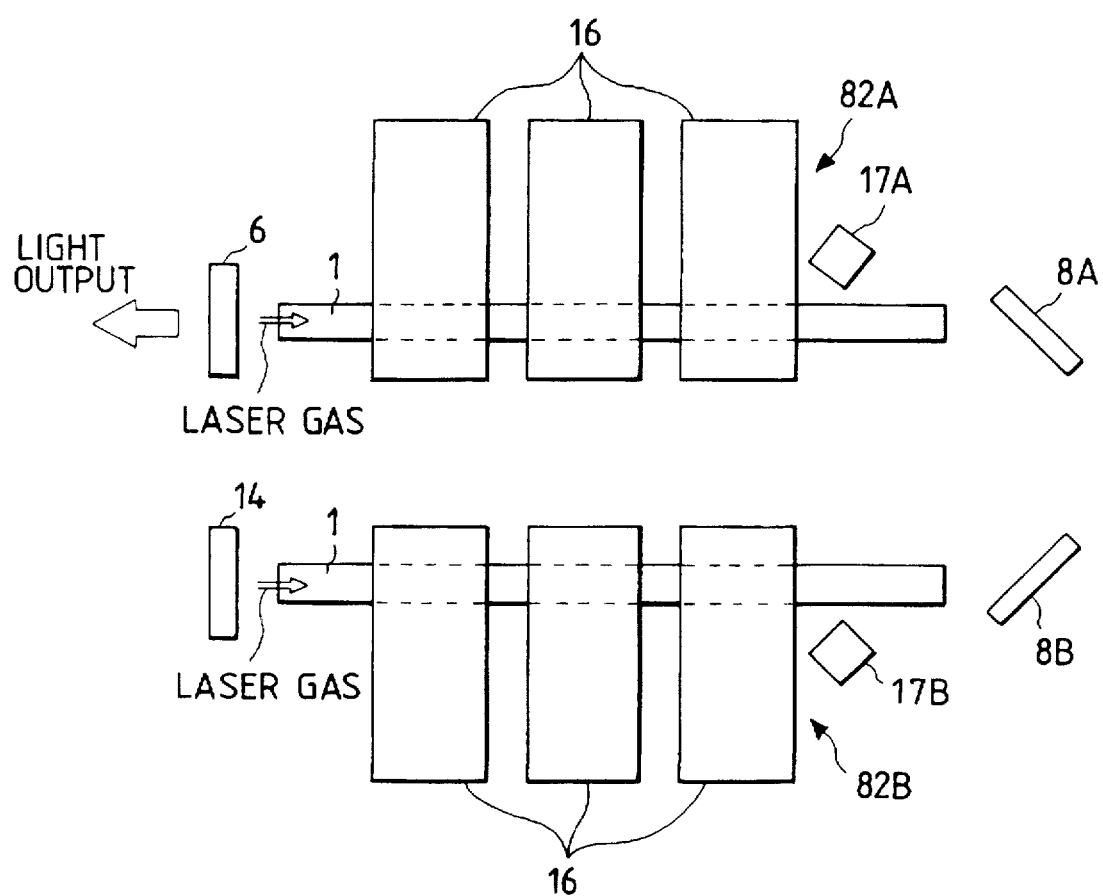
FIG. 13 is a diagrammatic plan view of a microwave excited gas laser apparatus according to a sixth embodiment of this invention.

FIG. 13 shows a sixth embodiment of this invention which is similar to the embodiment of FIGS. 11 and 12 except for design changes indicated later. As shown in FIG. 13, the sixth embodiment of this invention includes photodiodes 17A and 17B.

The photodiode 17A is located near the array of the waveguides 16 in the first unit 82A. The photodiode 17A faces a region in the discharge tube 1A which is immediately downstream of the array of the waveguides 16 in the first unit 82A with respect to the flow of the laser medium gas. The photodiode 17A detects discharge-related light leaking from the most-downstream discharge region. Since the intensity of the leak light tends to be great in the case of an abnormal discharge, the occurrence of such an abnormal discharge can be detected via the photodiode 17A.

The photodiode 17B is located near the array of the waveguides 16 in the second unit 82B. The photodiode 17B faces a region in the discharge tube 1B which is immediately downstream of the array of the waveguides 16 in the second unit 82B with respect to the flow of the laser medium gas. The photodiode 17B detects discharge-related light leaking from the most-downstream discharge region. Since the intensity of the leak light tends to be great in the case of an abnormal discharge, the occurrence of such an abnormal discharge can be detected via the photodiode 17B.

When the occurrence of an abnormal discharge is detected via the photodiode 17A or 17B, it is preferable to generate a command signal for correcting discharge conditions or suspending the discharge process.

It should be noted that the photodiode 17A may be positioned to face a region in the discharge tube 1A which is immediately upstream of the array of the waveguides 16 in the first unit 82A with respect to the flow of the laser medium gas. Also, the photodiode 17B may be positioned to face a region in the discharge tube 1B which is immediately upstream of the array of the waveguides 16 in the second unit 82B with respect to the flow of the laser medium gas.

Seventh Embodiment

Figure 14:
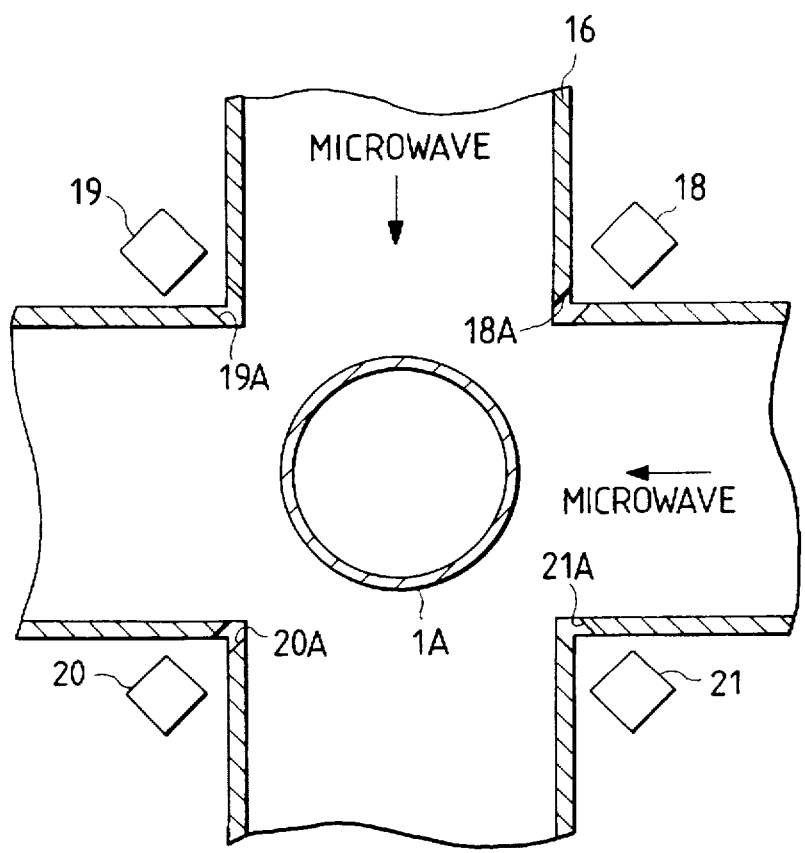
FIG. 14 is a sectional view of a waveguide in a microwave excited gas laser apparatus according to a seventh embodiment of this invention.

FIG. 14 shows a seventh embodiment of this invention which is similar to the embodiment of FIG. 13 except for design changes indicated later. As shown in FIG. 14, the seventh embodiment of this invention includes photodiodes 18, 19, 20, and 21 for each of the waveguides 16.

The photodiodes 18, 19, 20, and 21 are located outward of the intersection of the waveguide 16 at which the horizontal waveguide and the vertical waveguide meet. The walls of the waveguide 16 which define four corners of the intersection have apertures 18A, 19A, 20A, and 21A. The photodiodes 18, 19, 20, and 21 extend outward of the apertures 18A, 19A, 20A, and 21A respectively. The photodiodes 18, 19, 20, and 21 face the discharge tube 1A via the apertures 18A, 19A, 20A, and 21A.

The photodiodes 18, 19, 20, and 21 detects brightnesses of light generated by a discharge in the discharge tube 1A. A suitable device (not shown) compares output signals of the photodiodes 18, 19, 20, and 21 to detect a positional bias in the discharge. It is preferable to adjust conditions of the discharge in response to the result of the comparison among the output signals of the photodiodes 18, 19, 20, and 21.

What is claimed is:

1. A microwave excited gas laser apparatus comprising:

a single unit having at least first, second, third, and fourth waveguides, the first and second waveguides meeting at a first intersection, the third and fourth waveguides meeting at a second intersection;

a discharge tube containing a laser medium gas and extending through the first and second intersections; and means for radiating microwaves into the first, second, third, and fourth waveguides;

wherein the discharge tube in the first intersection is exposed to a microwave propagated along the first waveguide and a microwave propagated along the second waveguide, and the discharge tube in the second intersection is exposed to a microwave propagated along the third waveguide and a microwave propagated along the fourth waveguide.

2. A microwave excited gas laser apparatus as recited in claim 1, wherein a direction of an electric field of the microwave applied to the discharge tube via the first waveguide and a direction of an electric field of the microwave applied to the discharge tube via the second waveguide are different from each other, and a direction of an electric field of the microwave applied to the discharge tube via the third waveguide and a direction of an electric field of the microwave applied to the discharge tube via the fourth waveguide are different from each other.

3. A microwave excited gas laser apparatus comprising:

a single unit having first, second, third, and fourth waveguides, a first end of the first waveguide being connected to an end of the second waveguide, a second end of the first waveguide being connected to an end of the third waveguide, the second waveguide and the fourth waveguide meeting at a first intersection, the third waveguide and the fourth waveguide meeting at a second intersection;

a first discharge tube containing a laser medium gas and extending through the first intersection;

a second discharge tube containing a laser medium gas and extending through the second intersection;

a single optical resonator in which the first and second discharge tubes are disposed; and magnetrons coupled to the first and fourth waveguides for radiating microwaves into the first and fourth waveguides respectively;

wherein the first discharge tube in the first intersection is exposed to a microwave propagated along the second waveguide and a microwave propagated along the fourth waveguide, and the second discharge tube in the second intersection is exposed to a microwave propagated along the third waveguide and a microwave propagated along the fourth waveguide; and wherein a direction of an electric field of the microwave applied to the first discharge tube via the second waveguide and a direction of an electric field of the microwave applied to the first discharge tube via the fourth waveguide are different from each other, and a direction of an electric field of the microwave applied to the second discharge tube via the third waveguide and a direction of an electric field of the microwave applied to the second discharge tube via the fourth waveguide are different from each other.

4. A microwave excited gas laser apparatus comprising:

a single unit having first, second, third, and fourth waveguides, a first end of the first waveguide being connected to a first end of the second waveguide, a second end of the first waveguide being connected to an end of the third waveguide, a second end of the second waveguide being connected to an end of the fourth waveguide, the third waveguide and the fourth waveguide meeting at an intersection;

a discharge tube containing a laser medium gas and extending through the intersection; and a magnetron coupled to one waveguide among the first, second, third, and fourth waveguide for radiating a microwave into said one waveguide;

wherein the discharge tube in the intersection is exposed to a microwave propagated along the third waveguide and a microwave propagated along the fourth waveguide, and a direction of an electric field of the microwave applied to the discharge tube via the third waveguide and a direction of an electric field of the microwave applied to the discharge tube via the fourth waveguide are substantially perpendicular to each other.

5. A microwave excited gas laser apparatus as recited in claim 4, wherein the microwave is propagated from the magnetron to the discharge tube along two different paths in the first, second, third, and fourth waveguides, and a difference between effective lengths of the two different paths is equal to an integer times a quarter of a wavelength of the microwave.

6. A microwave excited gas laser apparatus comprising:

an output mirror and an end mirror composing an optical resonator, the end mirror serving as a total reflection mirror with respect to laser light, the end mirror being at least transparent with respect to visible light;

a discharge tube containing a laser medium gas and being located in the optical resonator;

means for applying a microwave to a portion of the discharge tube in the optical resonator; and means located outside the optical resonator and facing the discharge tube via the end mirror for measuring a distribution of brightness of light caused by a discharge in the discharge tube.

7. A microwave excited gas laser apparatus comprising:

a discharge tube containing a laser medium gas;

means for applying a microwave to a portion of the discharge tube; and means located outside the discharge tube for measuring a brightness of discharge-caused light leaking from the discharge tube.

8. A microwave excited gas laser apparatus as recited in claim 7, wherein the laser medium gas flows in the discharge tube, and said measuring means is located at a position downstream of the applying means as viewed in a direction of a flow of the laser medium gas in the discharge tube.

9. A microwave excited gas laser apparatus comprising:

a single unit having first and second waveguides which meet at an intersection, the unit having first, second, third, and fourth corners at the intersection, the unit having first, second, third, and fourth apertures at the first, second, third, and fourth corners respectively;

a discharge tube containing a laser medium gas and extending through the intersection;

means for radiating microwaves into the first and second waveguides respectively, wherein the discharge tube in the intersection is exposed to a microwave propagated along the first waveguide and a microwave propagated along the second waveguide, and a direction of an electric field of the microwave applied to the discharge tube via the first waveguide and a direction of an electric field of the microwave applied to the discharge tube via the second waveguide are substantially perpendicular to each other; and first, second, third, and fourth photosensitive members located outside the intersection and facing the discharge tube in the intersection via the first, second, third, and fourth apertures respectively for measuring brightnesses of light caused by a discharge in the discharge tube.

* * * * *